Figure 1:
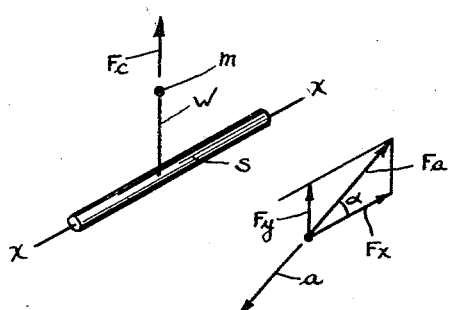

May 4, 1965 — A. M. VOUTSAS — 3,181,373
ACCELEROMETER
Filed Jan. 13, 1959 — 2 Sheets-Sheet 1

INVENTOR.
ALEXANDER M. VOUTSAS
BY
*Raymond A. Paquin*
ATTORNEY.

May 4, 1965 A. M. VOUTSAS 3,181,373
ACCELEROMETER
Filed Jan. 13, 1959 2 Sheets-Sheet 2
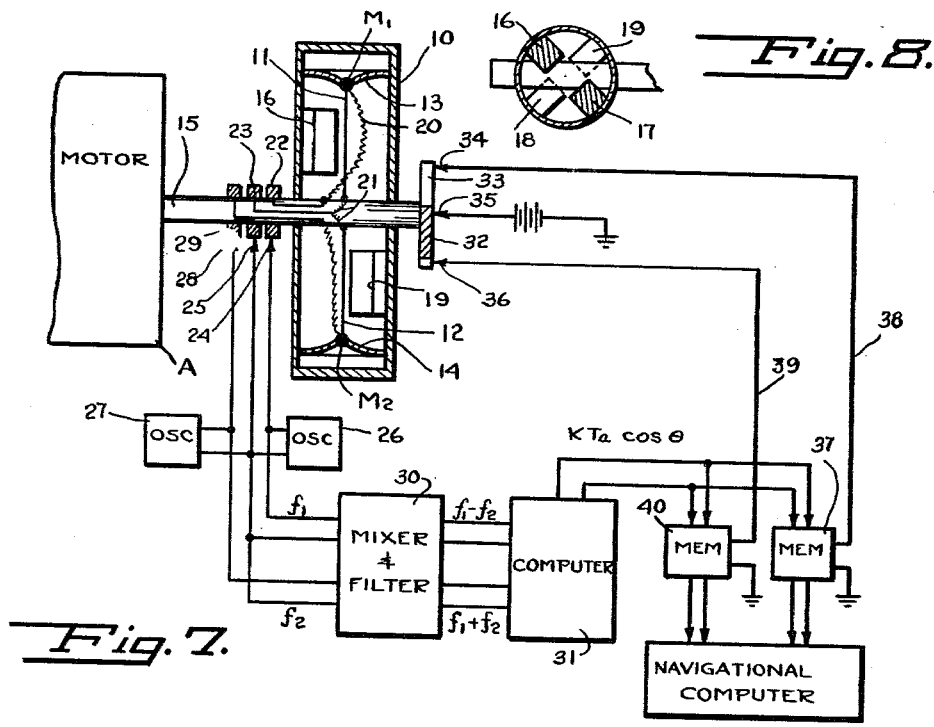
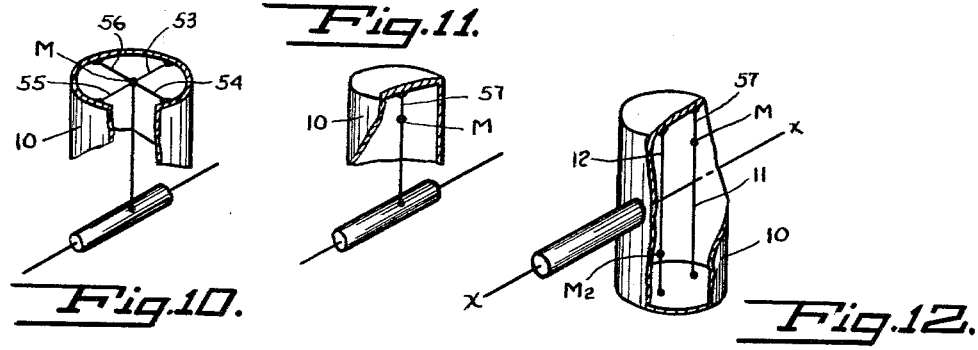
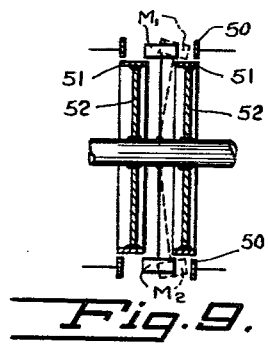
INVENTOR.
ALEXANDER M. VOUTSAS
ATTORNEY.

United States Patent Office 3,181,373
Patented May 4, 1965

3,181,373
ACCELEROMETER
Alexander M. Voutsas, New York, N.Y., assignor to American Bosch Arma Corporation, a corporation of New York
Filed Jan. 13, 1959, Ser. No. 786,558
4 Claims. (Cl. 73—517)

The present invention relates to accelerometers and has particular reference to integrating accelerometers. Integrating accelerometers are used to obtain high accuracy velocity measurements.

Present day application of navigational instruments in high speed vehicles, missiles, orbiting satellites and space ships demand extreme accuracy, wide operating range, constant scale factor with time and utmost reliability of its acceleration sensing devices. The present invention is a new type of accelerometer employing vibrating members as the sensing means and rotating members to provide both centrifugal tension and a two dimensional sweep of the acceleration field.

The present accelerometer includes a mass which rotates at constant speed around a fixed axis.

The mass may be suspended through a string-like member to a shaft or bearing on the fixed axis of rotation. The tension on the string, at any angular position of the mass, divided by the mass is equal to the sum of centrifugal accelerations plus all other accelerations which act at this angular position.

If a second rotating mass is placed diametrically opposite to the first mass, the mechanical unbalance will be greatly reduced, and if the supporting strings are transversely vibrated at the same frequencies at equal accelerations, then the total difference in frequency between the two strings will give the total acceleration minus centrifugal acceleration since the centrifugal acceleration is substantially cancelled.

In accordance with this invention a mass is connected to a wire or tape and the assembly is rotated to place the wire under tension by the centrifugal force of the rotating mass. The wires are caused to vibrate in planes normal to each other by connecting the wire in the oscillatory circuit of an oscillator and providing magnetic fields in which the wires vibrate in well known manner.

Acceleration in the plane produced by the rotating assembly will continuously vary the tension in the wire and will accordingly vary the vibrating frequency of the string. For ease of relating frequency variations to acceleration, a pair of vibrating wires with associated masses are oppositely disposed on the rotating assembly and their frequency difference is used as a measure of acceleration. The relationship being non-linear, demands some type of correction device, for a true interpretation of the frequency difference.

It will be seen that means for damping or measuring cross acceleration effects must be provided and means for preventing cross-coupling between the wires are necessary for precision and wider utility of the device.

Figure 2:
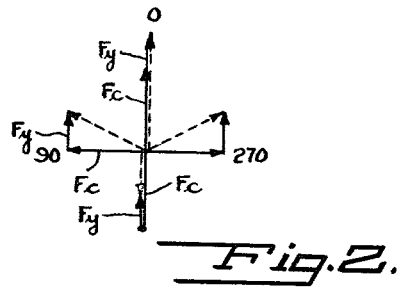
Figure 3:
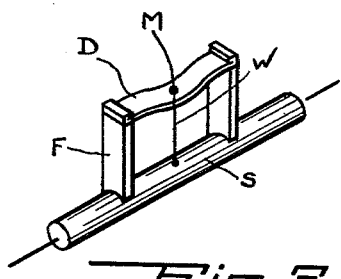
Figure 4:
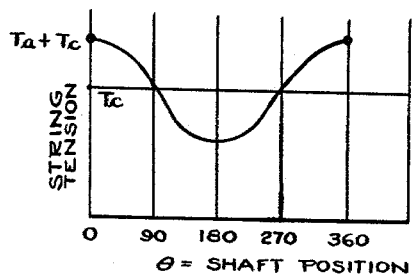
Figure 5:
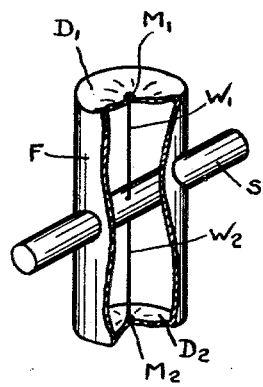
Figure 6:
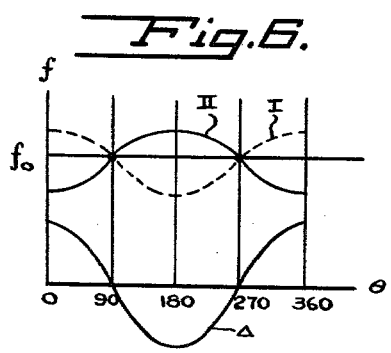

For a more complete understanding of the invention, reference may be had to the accompanying diagrams, in which:

FIG. 1 illustrates the basic element of the invention;
FIG. 2 is a force diagram;
FIG. 3 is a modification of FIG. 1;
FIG. 4 is a graph illustrating the variation in tension with shaft position;
FIG. 5 is a particular embodiment utilizing the device of FIG. 3;
FIG. 6 is a curve illustrating the operation of the embodiment of FIG. 5;
FIG. 7 is a more comprehensive illustration of a preferred embodiment, including modification of FIG. 5;
FIG. 8 is a cross sectional view through plane 8—8 of FIG. 7;
FIG. 9 illustrates certain desirable features;
FIG. 10 is a modification of FIG. 5;
FIG. 11 is another modification of FIG. 5;
FIG. 12 is a further modification of FIG. 5; and
FIG. 13 is a still further modification of FIG. 5.

FIG. 1 illustrates the basic elements of the invention. A mass M is connected to a shaft S by a wire W and the shaft is rotated about its axis X. The rotation of mass M about X at constant speed applies a centrifugal force Fc to the mass M which in the absence of any other acceleration forces will create a constant tension Tc in the wire W. When an acceleration of the shaft support occurs, an acceleration force acts on mass M, and the total force on M will be the vector sum of the centrifugal and acceleration forces.

For example, under an acceleration $a$, the additional forces on M will be $Fy=Fa \sin \alpha$ and $Fx=Fa \cos \alpha$ in the directions perpendicular and parallel to shaft S as shown in FIG. 1. FIG. 2 shows the way in which the tension in the wire W will vary for four positions of shaft S where the force on mass M is the vector sum of the Fc and Fy forces. It is assumed that the Fx force does not contribute to the total force since means are provided to resist the force Fx in the X direction. Such means may be realized by attaching the mass M to a diaphragm D, FIG. 3, which resists any motion other than radial motion of the mass M.

It should be noted that in FIG. 2 a reference position is chosen where the tension in the wire W is a maximum. The tension is not equal to Tc, the tension due to the centrifugal force alone, at the 90° and 270° positions of shaft S, but this value of tension Tc, occurs at a position greater than 90°, and a position less than 270°. In order to obtain a true sinusoidal variation of the tension, the non-radial component of the Fy force must be suppressed, as will be accomplished by the diaphragm D of FIG. 3. The tension in the wire W will vary according to the relationship $$T = Tc + Ta \cos \theta \qquad (1)$$

where $T$ = total tension in wire W
$Tc$ = tension due to centrifugal force
$Ta$ = maximum tension due to acceleration force in the radial direction = $Fy$
$\theta$ = displacement of shaft S from position of $Ta$ The curve representing T versus $\theta$ is shown in FIG. 4.

Wire W may be vibrated at its natural frequency by oscillator means as will be described later. The natural frequency of vibration, being proportional to the square root of the tension in the wire will follow generally curve I of FIG. 6, which relationship may be expressed as $$f_1 = K\sqrt{Tc + Ta \cos \theta} \qquad (2)$$

and if Tc is constant:

$$f_1 = K'\sqrt{1 + CTa \cos \theta} \qquad (3)$$

where K' and C are constants.

If the frequency of vibration of the wire at two selected positions separated by 90° of rotation of the shaft are observed and the Equation 3 is used to determine the angles $\theta$ and $\theta+90$ the direction and value of the maximum acceleration with respect to the first selected position may be found. The value of the acceleration may be determined by comparing the maximum frequency with the basic frequency of the vibrating wire, i.e., the frequency in the absence of acceleration. However, the accuracy is improved by obtaining a difference frequency between strings which are oppositely affected by the acceleration to eliminate the causes of certain error producing conditions.

For this reason, a second wire $W_2$ with a mass $M_2$ is attached to shaft S at a point diametrically opposite the first wire W. A second diaphragm $D_2$ prevents undesirable motion of mass $M_2$ with respect to the shaft S and limits the motion to radial motion. FIG. 5 shows a typical arrangement of masses M and $M_2$ and appropriate supporting structure enclosed within a cylindrical container C, partly broken away, which is rotated by shaft S.

The frequency of vibration of wire $W_2$ will be represented by the expression $$f_2 = K\sqrt{Tc - Ta \cos \theta}$$

and is shown on FIG. 6 as the curve II. The difference between curves I and II is shown by the curve $\Delta$ and represents the difference frequency $f_1 - f_2$ where negative values indicate that $f_1$ is smaller than $f_2$.

From (3) and (4)

$$f_1 - f_2 = K(\sqrt{Tc + Ta \cos \theta} - \sqrt{Tc - Ta \cos \theta}) \quad (7)$$

Equation 7 can be solved to give a value of $Ta \cos \theta$ as a function of the frequency difference, K and Tc, but the solution is not a linear one and the proportionality factor which includes Tc, is not as constant as desirable for precision. In order to evaluate $\theta$ and $Ta$, the frequency difference and sum values are obtained also at a position $(\theta - 90°)$ and the value proportional to $Ta \cos (\theta - 90)$ is determined by use of Equation 7. Since $\cos (\theta - 90)$ is the same as $\sin \theta$, the values of $Ta \cos \theta$ and $Ta \sin \theta$ can be applied to a resolver and the values of $\theta$ and $Ta$ determined thereby, or other components of $Ta$ can be obtained through rotation of axes in the resolver.

With reference now to FIGS. 7 and 8 there is shown a casing 10 mounted on a shaft 15 to which the vibrating wires 11, 12 are attached. The wires 11, 12 are stretched between the shaft 15 and respective diaphragms 13, 14. The wire 11 is located in the magnetic field of magnets 16, 17 and is adapted, by the placing of the magnets 16, 17, to vibrate in a plane at 45° with respect to the plane through shaft 15.

Wire 12 is located in the magnetic field of magnets 18, 19 and is adapted to vibrate in a plane normal to the plane of vibration of wire 11, by judicious placement of the magnets 18, 19.

A mass M is attached to the end of wire 11 at the diaphragm 13 and a similar mass $M_2$ is attached to the end of wire 12 at the diaphragm 14. Rotation of shaft 15 by a motor A, for example, will apply centrifugal force to the masses M and $M_2$ which will create tension in the wires 11 and 12. The wire tension is therefore a function of the square of the speed of rotation of the shaft 15, whence the basic tension of the wires 11, 12 is controlled by controlling the speed of shaft 15. The ends of wire 11 are electrically connected, through connections 20, 21 slip rings 22, 23 and brushes 24, 25 to the terminals of oscillator 26, while the wire 12 is similarly connected across the terminals of oscillator 27 through the brushes 25, 28 and slip rings 23, 29. The oscillator and magnet combinations keep the wires 11, 12 vibrating at their natural frequencies in accord with well known phenomena.

The signal outputs of the oscillators 26, 27 having frequencies equal to $f_1$ and $f_2$ respectively are applied to a mixer and filter 30 to obtain difference and sum frequency $f_1 - f_2$ and $f_1 + f_2$ signals. The difference signal may be used according to Equation 7 to determine $Ta \cos \theta$ continuously in the computer 31. This $KTa \cos \theta$ signal is a signal of some convenient frequency, proportional in magnitude to the instantaneous acceleration of the support in the direction defined by the wires 11, 12, i.e., the direction $\theta$. At selected reference points in the rotation of wires 11, 12 which points are separated by precisely 90°, the $KTa \cos \theta$ value is sampled and stored. Thus, shaft 15 drives a conducting segment 32 on disc 33 with which the brush contacts 34, 35, 36 cooperate. As the segment 32 passes under brushes 34, 35 the memory device 37 is activated by the pulse in connector 38 to store the $KTa \cos \theta$ output of computer 31 until the next pass of segment 32. Similarly, a pulse in connector 39 is produced as segment 32 passes under brushes 35, 36, causing the memory device 40 to receive and store the output $KTa \cos (\theta + 90)$ from the computer 31. The $KTa \cos \theta$ and $KTa \cos (\theta + 90)$ values are the rectangular components of the acceleration vector in the direction of the first reference position of the wires 11, 12 and in the second reference position respectively. These rectangular components which are available from the units 37, 40 may be used in a navigational computer for example, in the well known manner.

Although the basic embodiment has been described, many modifications can be made to this basic instrument for specific purposes.

For example, in eliminating the diaphragms 13 and 14, a number of capacitive pickoffs 50, FIG. 9, may be located around the periphery on each side of the plane formed by the two rotating masses to monitor the position of the mass at any instant. For every pickoff on one side of the plane there will be a corresponding pickoff on the opposite side of the plane.

When the moving mass assembly moves to the position between the two plates of one pickoff capacitor, the angular position of the mass is known from a signal generated by the pickoff capacitor to indicate a change of its characteristics. The two rotating mass assemblies can be constructed as to give different capacitance values when passing through the same pickoff. At the same instant the string frequency will indicate the acceleration vector sum at the angular position, indicated by the orientation of the pickoff.

If a cross acceleration perpendicular to the plane of rotation exists, the rotating strings will tend to produce a conical envelope and thus deviate from the flat disc envelope, dotted FIG. 9.

The rotating masses will then tend to get closer to the pickoffs of one plane and further away from the pickoffs of the other plane. This motion will break the capacitance equality between the opposite capacitors and through a closed loop system the axis of rotation with the stator assembly will be slewed on a gimbal assembly to a position where the plane of rotation is again parallel to the direction of the new resultant acceleration.

In addition, a protective ring 51 may be located on the plane of rotation, supported by diametrically opposite brackets 52 extending from the rotating axis.

The vibrating-rotating-string assembly will pass through a gap on the ring which is sufficiently large to clear the assembly so that it will freely move at a plane perpendicular to the plane of rotation without touching it when a cross acceleration is induced. The ring's main function is to prevent the rotating mass from losing its position with reference to the bearing while at rest. When the mass is rotated at the specified constant r.p.m., the centrifugal force will keep it clear again from touching the protective ring.

Further modification may be the following:

(a) The diaphragm 13 may be replaced by wires 53, 54, 55, 56 in the plane of the diaphragm which, if vibrated, can be used for accelerometer purposes, FIG. 10.

(b) The diaphragm 13 may be replaced by a wire 57 colinear with the sensitive vibrating wire, e.g., wire 11, FIG. 11.

(c) The wires 11, 12 need not necessarily be attached to the rotating axis on the same side as their associated weights, but may be attached to a structure, such as a crank, in order to provide a longer vibrating wire and hence a lower frequency of vibration, FIG. 12.

(d) More than two vibrating wires can be used to provide convenient means for resolving the indicated acceleration components into components in a desired set of axes. The number of wires may be three, in which case comparison with a fixed frequency is required or a multiple of two where a difference frequency can be observed to provide the desired information. The two or three components of acceleration effects thus obtained can be resolved into the desired components by two or three phase resolvers driven synchronously with shaft 15, not diagrammed.

(e) The sensitive wires 11, 12 may be attached between the casing and the masses with the masses $M_1$ and $M_2$ connected by an elastic member such as a wire 58, for example. As shown in FIG. 13, in this case the centrifugal force will decrease the initial tension in each of the sensitive strings 11, 12 rather than being the main tension applying force, but the two dimensional sweep of acceleration can still be made according to the present invention.

I claim:

1. In a device of the character described, an element adapted for rotation about an axis, a wire attached to said element, a mass attached to said wire, means for rotating said element about said axis, means for maintaining said wire radially disposed with respect to said axis so that the centrifugal force on said mass created by rotation of said element applies tension to said wire, means for vibrating said wire at its natural frequency, computer means controlled by the vibrational frequency of said wire whereby the instantaneous radial acceleration of said mass may be obtained, said wire being substantially unstressed when said element is not rotating.

2. In a device of the character described, an element adapted for rotation about an axis, a pair of wires attached to said element, a pair of masses attached to said wires, means for rotating said element about said axis, means for maintaining said wires radially disposed with respect to said axis so that the centrifugal force on said masses created by rotation of said element applies tension to said wires, means for vibrating said wires at their natural frequencies, computer means controlled by the vibrational frequencies of said wires whereby the instantaneous radial acceleration of said masses may be obtained, said wires being substantially unstressed when said element is not rotating.

3. In a device of the character described, an element adapted for rotation about an axis, a pair of opposed wires attached to said element, a pair of masses attached to said wires, means for rotating said element about said axis, means for maintaining said wires radially disposed with respect to said axis so that the centrifugal force on said masses created by rotation of said element applies tension to said wires, means for vibrating said wires at their natural frequencies, computer means controlled by the difference in said frequencies of said wires whereby the instantaneous radial acceleration of said masses may be obtained, said wires being substantially unstressed when said element is not rotating.

4. In a device of the character described, an element adapted for rotation about an axis, a plurality of wires attached to said element, a mass attached to each of said wires, means for rotating said element about said axis, means for maintaining said wires radially disposed with respect to said axis so that the centrifugal force on said masses created by rotation of said element applies tension to said wires, means for vibrating said wires at their natural frequencies, computer means controlled by the vibrational frequencies of said wires whereby the instantaneous radial acceleration of said masses may be obtained, said wires being substantially unstressed when said element is not rotating.

References Cited by the Examiner

UNITED STATES PATENTS

| 2,319,940 | 5/43 | Marrison | 264—1 X |
| 2,638,556 | 5/53 | Hausz | 264—1 |
| 2,725,492 | 11/55 | Allan | 264—1 |
| 2,726,074 | 12/55 | Ketchledge | 264—1 |
| 2,970,479 | 2/61 | Wikstrom | 73—514 |

FOREIGN PATENTS

| 1,026,690 | 2/53 | France. |
| 789,611 | 1/58 | Great Britain. |

RICHARD C. QUIESSER, *Primary Examiner.*

SAMUEL LEVINE, A. M. HORTON, JAMES J. GILL, *Examiners.*